United States Patent [19]

Wideman et al.

[11] Patent Number: 5,049,607

[45] Date of Patent: * Sep. 17, 1991

[54] RUBBER COMPOSITION COMPRISING ALKYL ($C_6$-$C_{22}$) AMIDES OF ROSIN ACID

[75] Inventors: Lawson G. Wideman; Paul H. Sandstrom, both of Tallmadge, Ohio

[73] Assignee: The Goodyear Tire & Rubber Company, Akron, Ohio

[*] Notice: The portion of the term of this patent subsequent to Oct. 4, 2005 has been disclaimed.

[21] Appl. No.: 411,981

[22] Filed: Sep. 25, 1989

[51] Int. Cl.$^5$ .............................. C08J 3/20; C08L 7/00; C08L 9/00
[52] U.S. Cl. .................................... 524/274; 524/270; 530/215; 530/221
[58] Field of Search ................ 530/221, 215; 524/274

[56] References Cited

U.S. PATENT DOCUMENTS

| | | | |
|---|---|---|---|
| 2,510,063 | 6/1950 | Bried | 530/221 |
| 4,566,997 | 1/1986 | Satoh et al. | 530/221 |
| 4,775,496 | 10/1988 | Wideman et al. | 530/221 |
| 4,946,879 | 8/1990 | Wideman et al. | 524/274 |
| 4,996,295 | 2/1991 | Wideman et al. | 524/274 |

FOREIGN PATENT DOCUMENTS 1441555  5/1966  France .

Primary Examiner—John Kight, III
Assistant Examiner—Rabon Sergent
Attorney, Agent, or Firm—Bruce J. Hendricks

[57] ABSTRACT

The present invention relates to alkyl ($C_6$-$C_{22}$) amides of rosin acids which are useful as a total or partial replacement for extender or processing oil in rubber formulations. Addition of the alkyl ($C_6$-$C_{22}$) amides of rosin acid also significantly reduce rheometer t25 and t90 values.

8 Claims, No Drawings

RUBBER COMPOSITION COMPRISING ALKYL ($C_6$–$C_{22}$) AMIDES OF ROSIN ACID

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids*, L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,491,655 discloses the use of methyl esters of rosin acid as total or partial replacement for oil in a rubber formulation. Compared with the use of aromatic extending oils in rubbers, methyl esters of rosin acids provide comparable processing and low temperature performance and superior abrasive resistance and flex resistance.

SUMMARY OF THE INVENTION

The present invention relates to alkyl ($C_6$–$C_{22}$) amides of rosin acid. The alkyl ($C_6$–$C_{22}$) amides of rosin acid function as a total or partial replacement for extender or processing oil and significantly reduce cure times of the rubber.

DETAILED DESCRIPTION OF THE INVENTION

There is disclosed a process for preparing rubber compositions which comprises admixing a rubber selected from the group consisting of natural rubber, homopolymers of conjugated diolefins, copolymers of conjugated diolefins and ethylenically unsaturated monomers or mixtures thereof with an alkyl ($C_6$–$C_{22}$) amide of rosin acid.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and an alkyl amide of rosin acid wherein the alkyl consists of an aliphatic radical having from about 6 to about 22 carbon atoms. Preferably the aliphatic radical has from about 12 to about 18 carbon atoms.

Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex TM rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. Examples of the rosin acids for use in the present invention include abietic, levopimaric, neoabietic, palustric, dehydroabietic, tetrahydroabietic, pimaric, isopimaric, $\Delta$-isopimaric, elliotinoic, sandaracopimaric or mixtures thereof. Over the years nomenclature of individual acids has changed. IUPAC nomenclature names resin acids as derivatives of abietane. Rosin acids are generally a mixture of the above acids. The two major rosin acid components are abietic acid having the following structural formula:

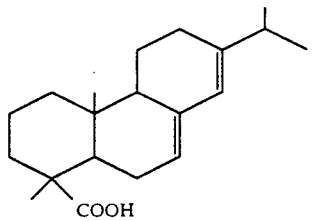

and dehydroabietic acid, having the structural formula:

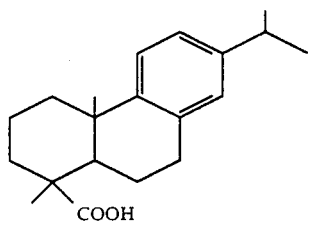

The acid number for the rosin acid may vary. Generally the acid number ranges from about 160 to about 175. Preferably the acid number is below 170 with a range of from about 165 to about 168 being particularly preferred.

The rosin acid or acids are reacted with an aliphatic amine having from about 6 to about 22 carbon atoms under amidation conditions. Representative of alkyl amines which may be used include hexyl amine, heptyl amine, octyl amine, nonyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine or mixtures thereof. Preferably the alkyl amine is dodecyl amine, hexadecyl amine or octadecyl amine.

The mole ratio of the rosin acid to alkyl amine may vary. Generally, the mole ratio of rosin acid to alkyl amine will range from about 0.5 to about 1.5. Preferably the mole ratio of rosin acid to alkyl amine is from about 0.6 to about 1.0.

The rosin acid or acids are reacted with the alkyl amine under amidation conditions to form the alkyl ($C_6$-$C_{22}$) amides of rosin acid. Representative of the products of the present invention are $C_6$-$C_{22}$ alkyl amides of the following acids: abietic, dehydroabietic, levopimaric, neoabietic, palustric, tetrahydroabietic, pimaric, isopimaric, Δ-isopimaric, elliotinoic, sandaracopimaric and mixtures thereof. Inclusive of the above amides are of the formula:

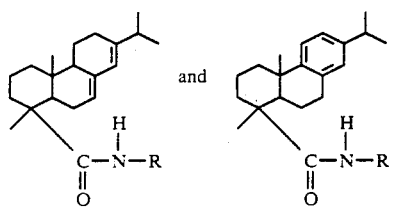

wherein R is an alkyl group having from about 6 to 22 carbon atoms. Preferably, R is an alkyl radical ranging from 12 to 18. In all cases R is an aliphatic group.

An organic solvent may be used to dissolve the rosin acid, to increase heat transfer and to facilitate water removal through a reflux trap. The solvent is preferably inert to the amidation reaction. Illustrative of solvents suitable for use in this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono and dialkylethers of ethylene glycol, propylene glycol, butylene glycol, diethylene glycol, dipropylene glycol oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid and not interfere with the amidation reaction.

The amidation reaction may be conducted in the presence of a catalyst to speed up the reaction. Examples of catalysts that may be used include acid catalysts such as sulfuric acid, hydrochloric acid and toluenesulfonic acid. Additional examples of catalysts include supported acid catalysts. The amount of catalyst that may be used will vary depending on the particular catalyst that is selected. For example, when an acid catalyst is used, from about 5 weight percent to about 10 weight percent is recommended.

The amidation reaction may be conducted over a variety of temperatures. The temperatures may range from moderate to an elevated temperature. In general, the amidation reaction may be conducted at a temperature ranging from about 100° C. to about 300° C. In most cases, when operating at the lower end of the temperature range, it is desirable to utilize pressures at the higher end of the range. The preferred temperature range is from about 120° C. to about 275° C., while the most preferred temperature range is from about 150° C. to about 240° C.

The amidation reaction may be conducted over a variety of pressures. Preferably the reaction is conducted at a pressure range of from about 0 to about 100 psig.

The amidation reaction is conducted for a period of time sufficient to produce the desired alkyl amide of rosin acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The amidation of the rosin acid may be carried out in a batch, semi-continuous or continuous manner. The amidation reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction Mixing induced by vibration, shaker, stirrer, rotating, oscillation, etc. are all illustrative of the types of agitation means which are contemplated for use in the amidation reaction. Such agitation means are available and well known to those skilled in the art.

Aside from functioning as a processing oil, addition of the alkyl ($C_6$-$C_{22}$) amide of rosin acid to sulfur vulcanizable elastomers enhances the rate of cure for sulfur vulcanizable rubber. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the present invention are natural rubber, polybutadiene, SBR and polyisoprene.

The vulcanizates containing the alkyl ($C_6$–$C_{22}$) amides of rosin acid find utility in, for example, the preparation of rubbers useful in preparing motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The alkyl $C_6$–$C_{22}$ amides of rosin acid may be used in a wide variety of proportions in the rubber and may be a substitute, in whole or part for conventional extender or process oils as well as serve to improve the cure rate of the vulcanizable rubber to which it is added. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of alkyl $C_6$–$C_{22}$ amides of rosin acid that may be added to the rubber may range from about 2 phr (parts per hundred rubber) to about 50 phr. Preferably the amount of alkyl $C_6$–$C_{22}$ amides of rosin acid that is added ranges from about 5 phr to about 35 phr.

The following examples are presented in order to illustrate but not limit the present invention.

EXAMPLE 1

Preparation of the Alkyl ($C_{12}$) Amide of Rosin Acid 150 grams of tall oil rosin acid and 137 grams of dodecyl amine were added to 11 grams of toluenesulfonic acid in 67 ml of m-xylene and charged into a Dean-Stark equipped 1-liter round bottom flask and a pot thermometer. After 16 hours of reflux at a pot temperature of 210° C., 90% of the theoretical amount of water was removed and was constant after addition of another one gram of toluenesulfonic acid. The acid number was 37 after a mild aqueous bicarbonate wash and vacuum oven drying at 80° C. IR analysis showed formation of the amide function.

EXAMPLE 2

Preparation of the Alkyl ($C_{18}$) Amide of Rosin Acid 150 grams of tall oil rosin acid with an acid number of 168 and 202 grams of octadecyl amine were added to 11 grams of toluenesulfonic acid in 67 ml of m-xylene and charged into a 3-neck, Dean-Stark equipped 1-liter round bottom flask and a pot thermometer. After 28 hours of reflux at a pot temperature of 240° C., 100% of the theoretical amount of water was removed. The acid number of the amide was 17. FTIR analysis of the product showed the disappearance of the acid group and formation of the amide functionality. The brown-colored wax melted slightly above room temperature. The reaction solvent was removed at 80° C. in a vacuum oven until constant weight was attained.

EXAMPLES 3–6

Rubber formulations were prepared in a two-stage process which consisted of the preparation of a nonproductive stage followed by the preparation of a productive stage. The nonproductive stage was prepared by mixing 40 parts of natural rubber, 60 parts of high cis-polybutadiene, 7.5 parts of wax and tackifiers, 7 parts of antidegradants, 1 part stearic acid, 50 parts of carbon black and 6 parts of the processing aid identified in Table I in a laboratory BR Banbury mixer. The Banbury mixer was operated at 70 rpm for about 3 minutes. After the nonproductive was prepared, 3 parts of zinc oxide, and 2.85 parts sulfur/accelerator were added in a productive Banbury stage which was mixed at 40 rpm for about 2 minutes. Table I lists the physical data for the four examples.

TABLE I

Cure Behavior and Vulcanizate Properties

|  | Processing Oil[1] | Thermal Oil[2] | Methyl Ester of Rosin Acid[3] | $C_{18}$ Amide of Rosin Acid[4] |
|---|---|---|---|---|
| Rheometer 150° C. | | | | |
| Max. Torque | 32.8 | 33.1 | 32.7 | 33.9 |
| Min. Torque | 9.8 | 9.5 | 9.8 | 9.5 |
| t90, minutes | 18.7 | 19.4 | 18.9 | 10.8 |
| t25, minutes | 7.4 | 7.7 | 7.5 | 4.9 |
| t1, minutes | 4.8 | 5.2 | 5.1 | 3.7 |
| Stress Strain (original) | | | | |
| Tensile Strength, MPa | 14.2 | 15.3 | 15.2 | 14.3 |
| Elongation at Break (%) | 570 | 605 | 608 | 580 |
| 300% Modulus (MPa) | 6.1 | 6.4 | 6.2 | 6.1 |
| Stress Strain (Air aged 7 days at 70° C.) | | | | |
| Tensile Strength, (MPa) | 13.8 | 13.9 | 13.9 | 12.5 |
| Elongation at Break (%) | 391 | 398 | 396 | 368 |
| 300% Modulus (MPa) | 10.4 | 10.5 | 10.4 | 10.1 |
| 66% Flex (min.-unbroken samples) | 180-8 | 161-7 | 180-8 | 147-4 |
| Monsanto Fatigue K Cycles | 1409 | 1084 | 1418 | 754 |
| Strebler to Itself, 95° C., Newtons | 78 | 66 | 77 | 67 |
| Rebound (ASTM D1054) | | | | |
| 100° C., % | 70.5 | 71.0 | 70.0 | 71.5 |
| Static Ozone Aged[5] | D2 | B3 | B3 | B3 |
| PG Flex, DeMattia (32nds) | 12 | 20 | 19 | 48 |

[1] Naphthenic/paraffinic processing oil.
[2] Thermal oil was a decarboxylated rosin acid prepared in accordance with U.S. Pat. No. 4,478,993.
[3] Hercolyn D ™ resin (hydrogenated methyl ester of rosin) obtained from Hercules, Inc. of Wilmington, Delaware.
[4] Prepared in accordance with Example 2.
[5] Static  0 = No cracking  F = Complete Failure
  Number of Cracks
  A = very few (less than ¼ surface)
  B = few (¼ to ½ surface)
  C = Moderate (½ to ¾ surface)
  D = Heavy (¾ to all surface)
  Size of Cracks
  1 = Small (hairline)
  2 = Medium
  3 = Large
  4 = Severe (open)

As can be seen from the above data, the $C_{18}$ amide of rosin acid appreciably accelerates cure of rubber over processing oil, thermal oil, and methyl ester of rosin acid, while maintaining many of the remaining physical properties of the vulcanizate, i.e., 300% modulus.

EXAMPLES 7-21

Rubber formulations were prepared in a two stage process which consisted of the preparation of a nonproductive stage followed by the preparation of a productive stage. The nonproductive stage was prepared by mixing 40 parts of natural rubber, 60 parts of high cis-polybutadiene, 7.5 parts of wax and tackifiers, 4 parts of antidegradants, 1 part stearic acid, 50 parts carbon black, 3 parts zinc oxide and 6 parts processing aid identified in Table II in a laboratory BR Banbury mixer. The Banbury mixer was operated at 70 rpm for about 3 minutes. After the nonproductive was prepared, 2.85 parts sulfur/accelerator were added in a productive Banbury stage which was mixed at 40 rpm for about 2 minutes. Examples 7-15 represent the prior art versus Examples 16-21 which represent various embodiments of the present invention. Tables III-VII list the physical data for Examples 7-21.

TABLE II

| | Compound | | | | | |
|---|---|---|---|---|---|---|
| | Microcrystalline Wax (phr) | Paraffinic Wax (phr) | Thermal Oil[1] (phr) | Methyl Ester[2] (phr) | $C_{12}$ Amide[3] (phr) | $C_{18}$ Amide[4] (phr) |
| Controls | | | | | | |
| 7 | 1.0 | .5 | — | — | — | — |
| 8 | 3.0 | 1.0 | — | — | — | — |
| 9 | 1.0 | .5 | — | — | — | — |
| 10 | 3.0 | 1.0 | — | — | — | — |
| 11 | — | — | 1.5 | — | — | — |
| 12 | — | — | 4.0 | — | — | — |
| 13 | — | 1.0 | 3.0 | — | — | — |
| 14 | — | — | — | 1.5 | — | — |
| 15 | — | — | — | 4.0 | — | — |
| Present Invention | | | | | | |
| 16 | — | — | — | — | 1.5 | — |
| 17 | — | — | — | — | 4.0 | — |
| 18 | — | 1.0 | — | — | 3.0 | — |
| 19 | — | — | — | — | — | 1.5 |
| 20 | — | — | — | — | — | 4.0 |
| 21 | — | 1.0 | — | — | — | 3.0 |

[1] Thermal oil was a decarboxylated rosin acid prepared in accordance with U.S. Pat. No. 4,478,993.
[2] Hercolyn D ™ resin (hydrogenated methyl ester of rosin) obtained from Hercules, Inc. of Wilmington, Delaware.
[3] Prepared in accordance with Example 1.
[4] Prepared in accordance with Example 2.

TABLE III

| | Non-Productive Stage Processing Parameters | | | | |
|---|---|---|---|---|---|
| Example | Mix Time | Mix Energy (MJ/m3) | Drop Temp | Banbury[1] Rating | Mill[2] Rating |
| Controls | | | | | |
| 7 | 2'30" | 592.9 | 163° C. | 2.5 | 1 |
| 8 | 2'30" | 573.5 | 169° C. | 2.5 | 1 |
| 9 | 2'15" | 549.2 | 171° C. | 3.5 | 1 |
| 10 | 2'15" | 515.2 | 177° C. | 3.5 | 1 |
| 11 | 2'15" | 532.2 | 174° C. | 3.0 | 1 |
| 12 | 2'15" | 510.3 | 173° C. | 3.5 | 1 |
| 13 | 2'15" | 517.6 | 171° C. | 3.5 | 1 |
| 14 | 2'15" | 532.2 | 176° C. | 3.0 | 1 |
| 15 | 2'15" | 505.4 | 173° C. | 3.0 | 1 |
| Present Invention | | | | | |
| 16 | 2'30" | 607.5 | 177° C. | 3.5 | 1 |
| 17 | 2'30" | 575.9 | 176° C. | 3.0 | 1 |
| 18 | 2'15" | 549.2 | 174° C. | 3.0 | 1 |
| 19 | 2'30" | 597.8 | 180° C. | 3.0 | 1 |
| 20 | 2'30" | 580.8 | 181° C. | 3.5 | 1 |
| 21 | 2'15" | 503.0 | 171° C. | 3.0 | 1 |

[1] Banbury Stock Rating
  1. Very shiny; well massed
  2. Shiny; massed
  3. Semi-shiny; fragmented
  4. Dull; fragmented
  5. Dull; crumbs
[2] Mill Handling Rating
  1. Very shiny; smooth, tight band
  2. Shiny; tight band; slightly rough
  3. Semi-shiny; tight band; rough
  4. Semi-shiny; slightly baggy; rough
  5. Dull; very baggy; rough As can be seen from use of compounds of the present invention versus the prior art (Examples 7-15), the $C_{12}$ and $C_{18}$ amides of rosin acid function as a viable substitute for conventional processing aids.

TABLE IV

| | Productive Stage Processing Parameters | | | |
|---|---|---|---|---|
| Example | Mix Time | Mix Energy (MJ/m3) | Drop Temp | Banbury Rating | Mill Rating |
| Controls | | | | | |
| 7 | 2'00" | 320.0 | 110° C. | 1.5 | 1 |
| 8 | 2'00" | 294.8 | 109° C. | 2.5 | 1 |
| 9 | 2'00" | 304.9 | 118° C. | 2.0 | 1 |
| 10 | 2'00" | 292.3 | 117° C. | 2.0 | 1 |
| 11 | 2'00" | 310.0 | 116° C. | 2.0 | 1 |
| 12 | 2'00" | 292.3 | 115° C. | 2.0 | 1 |
| 13 | 2'00" | 287.3 | 118° C. | 2.0 | 1 |
| 14 | 2'00" | 307.4 | 119° C. | 2.0 | 1 |
| 15 | 2'00" | 287.3 | 118° C. | 2.0 | 1 |
| Present Invention | | | | | |
| 16 | 2'00" | 297.4 | 111° C. | 2.0 | 1 |
| 17 | 2'00" | 284.8 | 114° C. | 2.0 | 1 |
| 18 | 2'00" | 299.9 | 118° C. | 2.0 | 1 |
| 19 | 2'00" | 297.4 | 116° C. | 2.0 | 1 |
| 20 | 2'00" | 287.3 | 116° C. | 2.0 | 1 |
| 21 | 2'00" | 292.3 | 117° C. | 2.0 | 1 |

As can be seen from use of the compounds of the present invention (Examples 16–21) versus the prior art (Examples 7–21), the $C_{12}$–$C_{18}$ amides of rosin acid function as a viable substitute for conventional processing aids.

TABLE V

| | 150° C. Cure Rheometer Data[1] | | | | |
|---|---|---|---|---|---|
| Example | S Min | S Max | T 1 | T 25 | T 90 |
| Controls | | | | | |
| 7 | 8.5 | 33.8 | 4.9' | 7.7' | 20.6' |
| 8 | 7.8 | 31.8 | 4.6' | 7.6' | 20.7' |
| 9 | 8.8 | 34.1 | 4.6' | 7.4' | 20.6' |
| 10 | 8.3 | 32.1 | 4.7' | 7.6' | 21.3' |
| 11 | 8.8 | 34.4 | 4.6' | 7.6' | 20.9' |
| 12 | 8.6 | 33.4 | 4.6' | 7.5' | 21.1' |
| 13 | 8.4 | 33.1 | 4.9' | 7.8' | 21.5' |
| 14 | 8.9 | 34.2 | 4.7' | 7.6' | 20.8' |
| 15 | 8.4 | 32.5 | 4.7' | 7.7' | 20.8' |
| Present Invention | | | | | |
| 16 | 8.7 | 35.7 | 4.0' | 6.0' | 15.1' |
| 17 | 8.2 | 34.8 | 3.2' | 4.3' | 10.4' |
| 18 | 8.5 | 34.2 | 3.7' | 5.1' | 12.4' |
| 19 | 8.8 | 35.2 | 4.3' | 6.5' | 16.4' |
| 20 | 8.2 | 34.3 | 3.9' | 5.5' | 13.1' |
| 21 | 8.3 | 34.1 | 4.1' | 5.9' | 14.7' |

[1]Monsanto Rheometer, 1° Arc

As can be seen from the above data, the state of cure (S Max-S Min) remains high for Examples 16–21 where appreciable rate acceleration is observed for the $C_{12}$–$C_{18}$ amides of rosin acid versus the waxes and oils of Examples 7–15.

TABLE VI

| | Cured Physical Properties | | | | | | |
|---|---|---|---|---|---|---|---|
| | Tensiles | | | 95° C. Strebler Adh (NTS) | | Zwick Rebound (100° C.) | Static[1] Ozone (25%) |
| Example | 300% Mod (MPa) | Break Str (MPa) | E/B (%) | To Self | To NR/SBR[2] | | |
| Controls | | | | | | | |
| 7 | 6.1 | 14.3 | 592 | 44.0 | 28.0 | 66.7% | C3 |
| 8 | 5.8 | 14.6 | 607 | 63.0 | 43.0 | 66.4% | 0 |
| 9 | 6.4 | 13.0 | 538 | 47.0 | 25.0 | 65.7% | B1 |
| 10 | 5.6 | 13.7 | 599 | 55.0 | 32.0 | 65.5% | 0 |
| 11 | 6.3 | 12.6 | 544 | 59.0 | 30.0 | 64.6% | C1 |
| 12 | 6.3 | 13.5 | 565 | 55.0 | 33.0 | 66.2% | C1 |
| 13 | 5.9 | 13.5 | 580 | 49.0 | 31.0 | 65.5% | A1 |
| 14 | 6.0 | 12.6 | 536 | 47.0 | 27.0 | 67.2% | C1 |
| 15 | 5.5 | 12.3 | 557 | 55.0 | 21.0 | 65.8% | C1 |
| Present Invention | | | | | | | |
| 16 | 6.8 | 12.9 | 516 | 44.0 | 30.0 | 66.8% | B3 |
| 17 | 6.2 | 12.4 | 524 | 50.0 | 26.0 | 65.7% | B2 |
| 18 | 5.6 | 12.9 | 549 | 47.0 | 27.0 | 67.5% | C1 |
| 19 | 6.6 | 13.0 | 528 | 44.0 | 26.0 | 64.8% | A3 |
| 20 | 6.0 | 11.1 | 486 | 46.0 | 25.0 | 65.2% | A2 |
| 21 | 6.2 | 12.1 | 511 | 48.0 | 27.0 | 65.8% | B1 |

[1]Ozone Rating  0 = no cracks  F = complete failure
Number of cracks:
A - very few (less than ¼ of surface)
B - few (¼ to ½ of surface)
C - moderate (½ to ¾ of surface)
D - heavy (¾ to all of surface)
Size of cracks:
1 - small (hairline)
2 - medium
3 - large
4 - severe (open)
[2]Compounded 70/30 natural rubber/SBR

What is claimed is:

1. A process for preparing rubber compositions which comprises admixing a rubber selected from the group consisting of natural rubber, homopolymers of conjugated diolefins copolymers of conjugated diolefins and ethylenically unsaturated monomers or mixtures thereof with an alkyl amide of rosin acid wherein the alkyl contains from about 6 to about 22 carbon atoms.

2. The process of claim 1 wherein the alkyl amide of rosin acid is at a concentration of from about 2 parts per hundred rubber to 50 parts per hundred rubber and is in an intimate mixture with said rubber.

3. The process of claim 1 wherein said rosin acid moiety is derived from abietic, levopimaric, neoabietic, palustric, dehydroabietic, tetrahydroabietic, pimaric, isopimaric, Δ-isopimaric, elliotinoic, sandarapimaric or mixtures thereof.

4. A rubber composition which comprises (1) a rubber selected from the group consisting of natural rubber, homopolymers of conjugated diolefins and copolymers of conjugated diolefins, ethylenically unsaturated monomers or mixtures thereof and (2) an alkyl amide of rosin acid wherein said alkyl contains from about 6 to about 22 carbon atoms.

5. The rubber composition of claim 4 wherein the rubber is selected from the group consisting of natural rubber, polybutadiene, SBR, polyisoprene or mixtures thereof.

6. The rubber composition of claim 5 wherein said alkyl amide of rosin acid is at a concentration of from about 2 parts per hundred rubber to 50 parts per hundred rubber.

7. The rubber composition of claim 6 wherein said alkyl amide of rosin acid is at a concentration of from about 5 parts per hundred rubber to 35 parts per hundred rubber.

8. The rubber composition of claim 4 wherein said rosin acid moiety is derived from the group of acids selected from the group consisting of abietic, levopimaric, neoabietic, palustric, dehydroabietic, tetrahydroabietic, pimaric, isopimaric, Δ-isopimaric, elliotinoic, sandarapimaric or mixtures thereof.

* * * * *